(12) United States Patent
Scremin

(10) Patent No.: US 8,840,392 B2
(45) Date of Patent: Sep. 23, 2014

(54) TEMPERATURE GRADIENT CONTROLLER DEVICE IN PARTS OF MACHINES FOR PROCESSING PLASTIC MATERIALS

(76) Inventor: Marina Scremin, Castronno (IT)

( * ) Notice: Subject to any disclaimer, the term of this patent is extended or adjusted under 35 U.S.C. 154(b) by 582 days.

(21) Appl. No.: 12/866,648

(22) PCT Filed: Jan. 27, 2009

(86) PCT No.: PCT/IB2009/050332
§ 371 (c)(1),
(2), (4) Date: Sep. 2, 2010

(87) PCT Pub. No.: WO2009/098608
PCT Pub. Date: Aug. 13, 2009

(65) Prior Publication Data
US 2011/0014313 A1    Jan. 20, 2011

(30) Foreign Application Priority Data
Feb. 8, 2008   (IT) .............................. MI2008A0201

(51) Int. Cl.
*B29C 47/86*   (2006.01)
*G05D 23/19*   (2006.01)
*B29C 47/92*   (2006.01)
*B29C 47/20*   (2006.01)
*B29C 47/00*   (2006.01)

(52) U.S. Cl.
CPC ..... *B29C 47/862* (2013.01); *B29C 2947/92857* (2013.01); *G05D 23/19* (2013.01); *B29C 2947/92542* (2013.01); *B29C 2947/92695* (2013.01); *B29C 2947/92647* (2013.01); *B29C 47/20* (2013.01); *B29C 2947/92704* (2013.01); *B29C 2947/92904* (2013.01); *B29C 47/92* (2013.01); *B29C 47/0021* (2013.01); *B29C 47/86* (2013.01); *B29C 2947/92628* (2013.01)
USPC .................. 425/378.1; 425/380; 425/467

(58) Field of Classification Search
USPC ............. 425/133.1, 174.4, 378.1, 379.1, 380, 425/467
See application file for complete search history.

(56) References Cited

U.S. PATENT DOCUMENTS

| | | | | |
|---|---|---|---|---|
| 4,088,434 A | * | 5/1978 | Fukuda et al. | 425/467 |
| 4,192,637 A | * | 3/1980 | Chong | 425/140 |
| 6,116,883 A | * | 9/2000 | Takeuchi et al. | 425/72.2 |
| 2007/0069429 A1 | * | 3/2007 | Albrecht et al. | 264/482 |

FOREIGN PATENT DOCUMENTS

CN     101 077 507 A    11/2007

OTHER PUBLICATIONS

PCT Office, International Search Report for PCT/IB2009/050332, 3 pages, mailed Sep. 1, 2011.

* cited by examiner

*Primary Examiner* — Yogendra Gupta
*Assistant Examiner* — Joseph Leyson
(74) *Attorney, Agent, or Firm* — Pearne & Gordon LLP

(57) ABSTRACT

A temperature gradient controller device in parts of machines for processing plastic materials comprises heating means to be operatively activated on at least one part of a machine; this heating means comprises vector means adapted to transfer a predetermined amount of heat to said part of said machine by remote radiation.

9 Claims, 2 Drawing Sheets

TEMPERATURE GRADIENT CONTROLLER DEVICE IN PARTS OF MACHINES FOR PROCESSING PLASTIC MATERIALS

FIELD OF THE INVENTION

The present invention relates to a device for control of the temperature gradient in parts of machines for processing plastic materials, that can be particularly employed in operative association with an extruder device to be used for processing operations both on products to a macroscopic scale and on products of particularly reduced sizes (i.e. in the micro-extrusion field).

DESCRIPTION OF RELATED ART

It is known that in the manufacture of items of plastic material (and in particular in the manufacture of tubular extruded articles) internally having one or more "ports" or empty sections, arrangement of a suitable machinery is required which generally comprises at least one extrusion head or more generally one component adapted to form a flow of molten material by effect of the inherent malleability of the material itself (a calender for example, or extrusion head, as said).

Said extrusion head internally has a so-called "holed force plug"; said plug forms the inner cavity of the tubular article of manufacture, while the remaining portion of the extrusion head defines the outer shape of said tubular article.

Usually, the force plug has a through hole enabling injection of air or an inert gas (or other fluid) into the material being extruded, so as to define the inner cavity thereof; this cavity is obviously such oriented that it is coaxial with the axis of the extruded article of manufacture.

While the above mentioned known art is conceptually very simple and is still widely used, it has an important drawback above all in terms of accuracy, versatility and size limits of the obtainable products.

In fact, if extruded tubular articles (or articles with axial inner cavities) of particularly reduced sizes are to be made, it becomes very difficult to control flowing of the material through the extrusion head.

This problem is particularly heavy, exactly as regards defining of the inner cavity; in fact, in order to maintain the right viscosity of the material submitted to plastic deformation (at the interface with surfaces in relative motion with the material), it is necessary to keep the force plug of the extrusion head to a suitable temperature; usually this temperature is maintained by virtue of particular types of electric resistors buried in the plug itself.

Should the force plug sizes become small below a given threshold (for instance, under a 2 mm diameter), the usual electric heating resistors would have such sizes that correct mounting of same into the force plug is inhibited; therefore, as a result, there is a substantially impossibility of extrusions being made with particularly reduced through cavities, since if the force plug is not maintained to the proper temperature, it is not possible to ensure continuity and/or regularity of the inner cavity, above all in terms of surface geometry of said inner cavity.

The known art therefore is not able to operate below certain minimum sizes or at all events is not able to ensure a suitable temperature level (and related heating homogeneity) to a force plug for particularly small extrusion heads.

In addition, the just mentioned problems become worse if extrusion of articles of manufacture takes place starting from particular raw materials, such as the fluoropolymers having rather critical features in terms of viscosity in the fluid state and thermal behaviour, and also have such a behaviour that it is possible for the surface of the article of manufacture to acquire an unacceptable roughness as a result of even minimum temperature differences at the sliding/relative movement interface between the fluoropolymer mass and the extruder (or more generally that part of the processing machinery that is designed to plastically deform the plastic material, such as the roller of a calender, for example).

In other words, in the machines of known type for processing plastic materials, the heat taken away from the molten polymer flow induces a variation in the relative-sliding conditions at the interface between the material under processing and the machine itself; for obviating this loss of heat, it is not possible to reduce the sizes of the usual electric resistors beyond a given limit (which electric resistors should be, on the contrary, rather big, at least in terms of thickness of the wire so as to carry a sufficient amperage).

On the other hand, the problem relating to the size of the electric heating resistors of known type cannot be solved by even making use of superconductive materials which operate at much lower temperatures than those to which the machines taken into account in the present invention operate (by way of example, an extruder must reach about 300-450° C.).

Accordingly, the present invention aims at conceiving an extruder device capable of obviating the above mentioned limits.

Mainly, the technical task of the present invention is to conceive a device for temperature gradient control in parts of machines for processing plastic materials to be particularly used in an extruder or similar machine, that is able to form tubular articles or at all events articles of manufacture having inner cavities of reduced sizes, and in particular articles of manufacture having outer diameters smaller than or as small as 2 millimeters and/or inner diameters smaller than or as small as 1.5 millimeters.

At the same time, the present invention aims at conceiving a device for temperature gradient control in parts of machines for processing plastic materials that is efficiently able to maintain the correct operating conditions for producing films from calendering operations having particularly small thicknesses.

It is a further aim of the present invention to conceive a device that is able to ensure a constant and uniform temperature to be maintained for the force plug under any operating situation and in association with any type of raw material being extruded, such as the fluoropolymer materials.

Another aim of the invention is to conceive a device that is highly reliable, of very simple construction and low running costs.

SUMMARY OF THE INVENTION

The technical task mentioned and the aims specified are substantially achieved by a temperature gradient controller device in parts of machines for processing plastic materials, to be particularly used in an extruder or similar machine, having the features set out in one or more of the appended claims.

BRIEF DESCRIPTION OF THE DRAWINGS

The description of a preferred but not exclusive embodiment of a device in accordance with the present invention is now given by way of non-limiting example and with reference to the accompanying drawings, in which.

DETAILED DESCRIPTION OF PREFERRED EMBODIMENTS OF THE INVENTION

Figure 1:
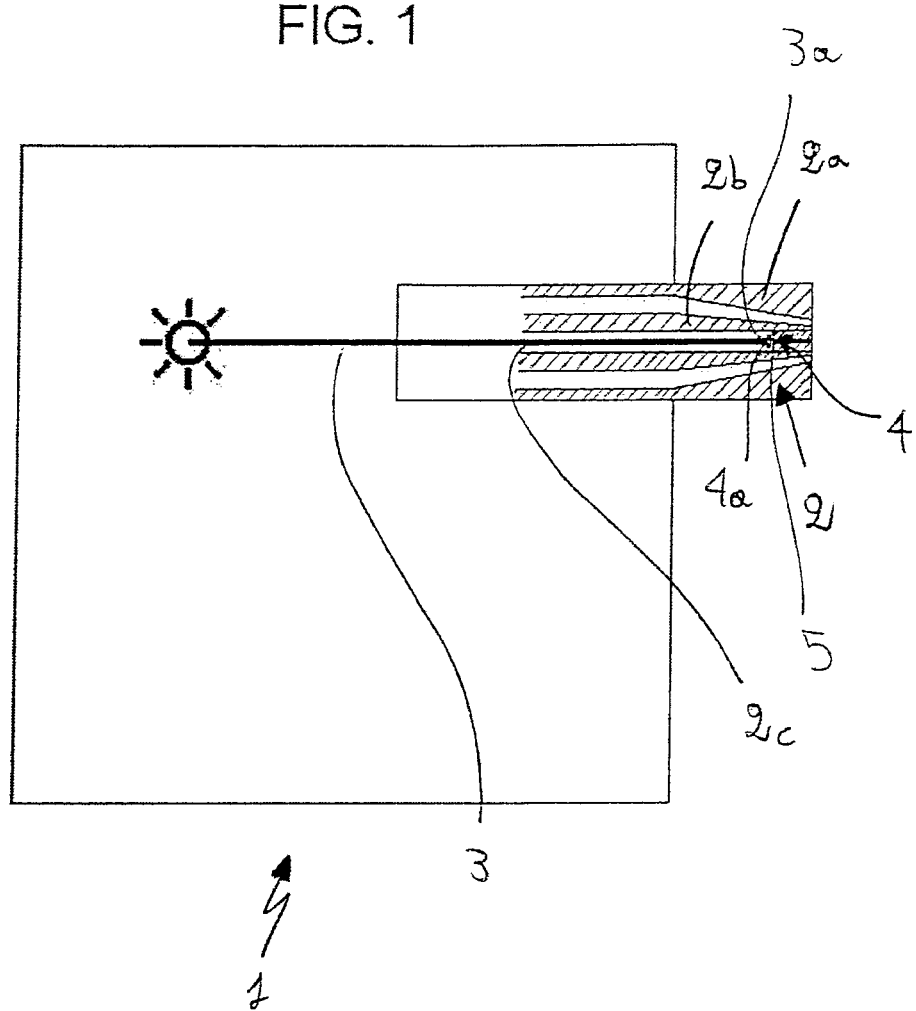
FIGS. 1 and 2 are general diagrammatic views of the embodiments of the device in accordance with the invention which, by way of example, is mounted on extruders.
Figure 2:
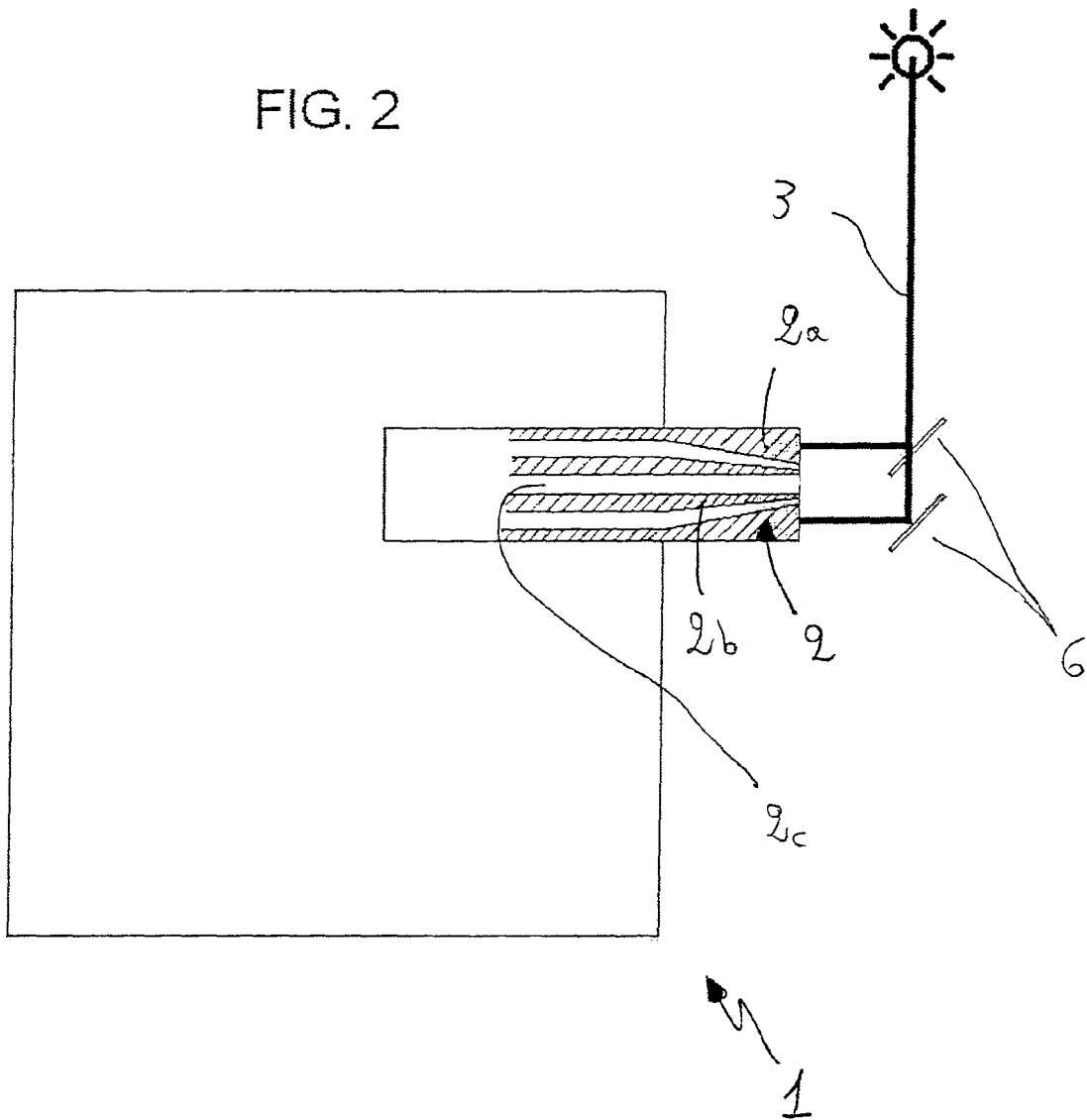

With reference to the drawings, the device of the invention has been denoted by reference numeral 1 and substantially comprises heating means to be operatively activated on at least one part 2 of a machine; advantageously, this heating means comprises vector means 3 adapted to transfer a predetermined amount of heat to the machine part 2 by remote radiation.

Within the scope of the present invention it is therefore to be noted that this device for temperature gradient control in parts of machines for processing plastic materials can find a great number of applications and can be activated on machine parts or pieces of greatly varying type and construction; a particular application of this device can be provided within the structure of an extruder to be used for manufacturing tubular articles and/or articles having at least one inner cavity (or, depending on requirements, a particular application can be provided within the structure of a roller calender to be used for producing films or strip-like elements having a more or less extended width and a particularly reduced thickness).

Unlike the functional heating units of known type (that, as seen, utilise thermal conduction and therefore require suitable heating elements directly in contact with the part to be heated), in the present device the vector means 3 is adapted to exert the above mentioned "remote radiation" without the presence of conductive heat fluxes through intermediate pieces or parts interposed between an energy source 2 and the machine part 2 to be heated; heat transfer therefore takes place through immaterial means, and energy transfer from the source to the part to be heated takes place in a space that advantageously can be considered as "empty" or at all events can be at most taken up by substances in a gaseous, a fluid or similar phase.

Conveniently, the vector means 3 comprises a beam of electromagnetic radiation; depending on current requirements, the composition of this beam (and the relevant density, energy, dispersion and orientation parameters) can be selected in a rather flexible manner.

It should be further noticed that within the scope of the present invention the electromagnetic-radiation beam can also be replaced or integrated with an energy beam having a different physical nature (such as an ultrasonic-wave beam or more generally a beam of waves of any nature).

According to a particularly appreciable embodiment of the present invention, the just mentioned beam of electromagnetic radiation can consist of a laser beam, but other alternative choices can contemplate use of microwaves and/or visible light and/or infrared and/or ultraviolet light or the like (ionising radiation, plasma particles and so on).

In other words, the electromagnetic-radiation beam is collimated within the machine part 2, and more particularly is collimated towards the impact body 4; the energy radiation therefore takes place first on the impact body 4 which in turn transfers heat to the machine part 2.

It should be noted that due to the possibility of providing a particularly compact and concentrated electromagnetic-radiation beam, the impact body 4 can have very restricted sizes; consequently the part 2 housing the impact body 4 can have an inner cavity correspondingly small in terms of sizes.

Consistently with the above remarks, the impact body 4 is thermally connected by conduction to the machine part 2 and further has a collimating surface 4a defining a predetermined angle of incidence relative to the electromagnetic-radiation beam; in order to maximise the heating efficiency (and also to avoid the electromagnetic-radiation beam being reflected and/or dispersed due to unwanted impacts on surfaces that are not correctly oriented), this angle of incidence is preferably included between 80° and 120° and more preferably is of about 90°.

Should the machine of the present invention be an extruder for manufacturing tubular articles (or at all events articles having at least one inner cavity), the machine part 2 to be heated can conveniently be an extrusion head 2a; in this case, the vector means 3 can be preferably activated on a so-called "force plug" 2b mounted internally of the extrusion head 2a itself.

In more detail in terms of structure, it is possible to see that the extrusion head 2a substantially comprises an outer boundary portion and a force plug 2b coaxially mounted within said outer boundary portion; in turn, the force plug 2b has an inflow channel 2c formed therein for routing a mass of gaseous substance, adapted to create the inner cavity in the article of manufacture, towards the extrusion head.

Advantageously, the electromagnetic-radiation beam is collimated towards the force plug 2b preferably in a focus 3a placed within the inflow channel 2c; in this way, unwanted reflections and/or dispersions of the beam (and the energy thereof) on the walls of the inflow channel 2c are avoided.

Conveniently, the impact body 4 is inserted in the inflow channel 2c at focus 3a, and preferably at an outlet end thereof; in this manner the force plug 2a is maintained to a suitable temperature, even at the farthest portions thereof.

In order to enable forming of the inner cavity in the extruded article of manufacture, the impact body 4 comprises at least one passage duct 5 brought into fluid communication with the inflow channel 2c and open towards said outlet end; due to this passage duct 5, the pneumatic continuity of the extrusion line (and in particular of the extrusion head) is not interrupted, normal operation of same being ensured (while the electromagnetic-radiation beam is travelling within the inflow duct 2c).

Depending on current requirements, the electromagnetic-radiation beam can be collimated also on different points of the force plug 2b or even on different parts of the machine; for instance, the electromagnetic-radiation beam can be incident on an outer or front part of the extrusion head, so that appropriate heating of same is carried out (always by radiation).

Therefore, depending on the machine part 2 to be heated, it will be possible to select the angle of collimation of the electromagnetic-radiation beam in the most appropriate manner, which beam in turn depends on the concentration or dispersion features of the thermal energy to be irradiated onto the machine part.

According to a further advantageous feature of the present invention, the vector means 3 further comprises a pointing and adjusting unit 6 operatively acting on the geometry and/or the direction of the electromagnetic-radiation beam; this pointing and adjusting unit 6 typically comprises a predetermined number of optical lens devices (provided with the related mechanical suspensions and adjustment elements) and is advantageously put to a minimum safety distance from the impact body 4; so as to avoid risks connected with spurious returns of the radiation beam and/or to avoid overheating dangers.

It should be noted that the minimum safety distance involves that, according to the present invention, machine parts 2 which can even be located to a great depth in the machine itself will be reached and heated; this is essentially made possible due to the properties of the electromagnetic-radiation beam.

As far as an extruder is concerned, this minimum safety distance can be of about 170 millimeters, for example; this distance, just as an indication, is adapted to enable an optimal collimation and at the same time an appropriate energy density on the impact region of the electromagnetic-radiation beam.

As already mentioned several times in the progress of the specification, the present device can advantageously be applied to one or more rollers of a calendering machine; in this way, the electromagnetic-radiation beam is focused on a suitable point of the roller which in turn is submitted to an inner distribution of the thermal energy from the beam through heating by conduction.

Conveniently, positioning of the device being the object of the present invention relative to the roller of said calendering machine can take place in such a manner as to avoid interferences between the optical line along which the electromagnetic-radiation beam travels and the different pieces of said calendering machine.

Accordingly, it is also an object of the present invention to provide a machine for processing plastic materials (which can be and extruder and/or a calendering machine, for example) which comprises at least one temperature gradient controller device in parts of machines for processing plastic materials; this device will be operatively active on an interface region between a predetermined amount of plastic material being processed and at least one machine part or piece.

The invention achieves important advantages.

In fact, due to the particular construction architecture of the present device, it is possible to induce a more appropriate work temperature in the holed force plug of an extruder (or at all events, in parts of extruders or of different types of machinery requiring a well-defined temperature gradient); this temperature is also reached in a short period of time and is maintained to the maximum homogeneity inside the force plug, until its end placed in the vicinity of the true extrusion exit.

In addition, it is possible to see that the particular choice of the thermal-energy vector means allows any material interference with the air/gas inflow duct to be avoided, which duct therefore can work under optimal efficiency conditions and consequently ensure an optimal shape continuity and regularity to the inner wall of the tubular cavity.

Incidentally, it is to be noted that the energy efficiency obtained through the radiation process by the electromagnetic-radiation beam (which can be of various nature and, if necessary, even comprise a ionising, plasma, cosmic radiations or others) is much greater than that usually obtained through utilisation of resistors of known type (operation of which is based on the so-called "Joule effect").

In addition, the possibility of controlling and finely focusing the thermal-energy vector ray within the holed force plug (or more generally, within the machinery part the temperature gradient of which is wished to be controlled) allows the delicate machine parts to be maintained to a position at which they are not submitted to too much heating, which is advantageous in terms of operating reliability.

It is finally to be pointed out that the present invention allows low manufacturing costs to be maintained for the machine itself and does not involve particular complications or modifications even when to be adapted on machinery of known type, which is advantageous for the overall production economy and the final price of the device itself.

The invention claimed is:

1. A temperature gradient controller device in parts of machines for processing plastic materials configured for manufacturing tubular articles and/or articles having at least one inner cavity having an inner diameter smaller than or as small as 1.5 millimeters, said device comprising heating means to be operatively activated on at least one part of a machine, said heating means comprising vector means configured to transfer a predetermined amount of heat to said part of said machine by remote radiation, the vector means comprising an electromagnetic-radiation beam;

wherein said part is an extrusion head which comprises an outer boundary portion and at least one force plug coaxially mounted inside said outer boundary portion and having an inflow channel formed in the force plug, the vector means acting on said force plug, wherein the device also comprises an impact body inserted in the inflow channel at a focus located at an outlet end of the inflow channel and adapted to receive said electromagnetic-radiation beam, wherein said vector means is adapted to carry out said remote radiation without conductive heat fluxes through intermediate pieces or parts interposed between an energy source and said impact body, and wherein the electromagnetic-radiation beam is collimated towards the force plug in said focus.

2. A device as claimed in claim 1, wherein said electromagnetic-radiation beam comprises a microwave beam and/or a beam of visible light and/or an infrared and/or ultraviolet and/or laser light.

3. A device as claimed in claim 1, wherein said impact body is thermally connected by conduction to the machine part and further has a collimation surface defining a predetermined angle of incidence relative to the electromagnetic-radiation beam.

4. A device as claimed in claim 1, wherein the impact body comprises at least one passage duct brought into fluid communication with the inflow channel and open towards said outlet end.

5. A device as claimed in claim 1, wherein the vector means further comprises a pointing and adjusting unit operatively acting on the geometry and/or direction of the electromagnetic-radiation beam, said pointing and adjusting unit comprising a predetermined number of optical lens devices and being located to a minimum safety distance from an impact body.

6. An extruder configured for manufacturing tubular articles and/or articles having at least one inner cavity having an inner diameter smaller than or as small as 1.5 millimeters, comprising at least one temperature gradient controller device operatively acting on an interface region between a predetermined amount of plastic material being processed and at least one piece or part of the extruder itself; said temperature gradient controller device comprising heating means configured to be operatively activated on at least one part of the extruder, said heating means comprising vector means configured to transfer a predetermined amount of heat to said part of the extruder by remote radiation, the vector means comprising an electromagnetic-radiation beam;

wherein the extruder comprises an extrusion head, the extrusion head comprising an outer boundary portion and at least one force plug coaxially mounted inside said outer boundary portion and having an inflow channel formed in the force plug, the vector means acting on said force plug, wherein the device also comprises an impact body inserted in the inflow channel at a focus located at an outlet end of the inflow channel and adapted to receive said electromagnetic-radiation beam, wherein said vector means is adapted to carry out said remote radiation without conductive heat fluxes through intermediate pieces or parts interposed between an energy source and said impact body, and wherein the electromagnetic-radiation beam is collimated towards the force plug in said focus.

7. A device as claimed in claim 3, wherein said angle of incidence is included between 80° and 120°.

8. A device as claimed in claim 3, wherein said angle of incidence is an angle of about 90°.

9. A device as claimed in claim 6, wherein said electromagnetic-radiation beam comprises a microwave beam and/or a beam of visible light and/or an infrared and/or ultraviolet and/or laser light.

* * * * *